March 12, 1963
L. M. PUSTER
3,080,853
CONTROL MECHANISM
Filed Feb. 2, 1961
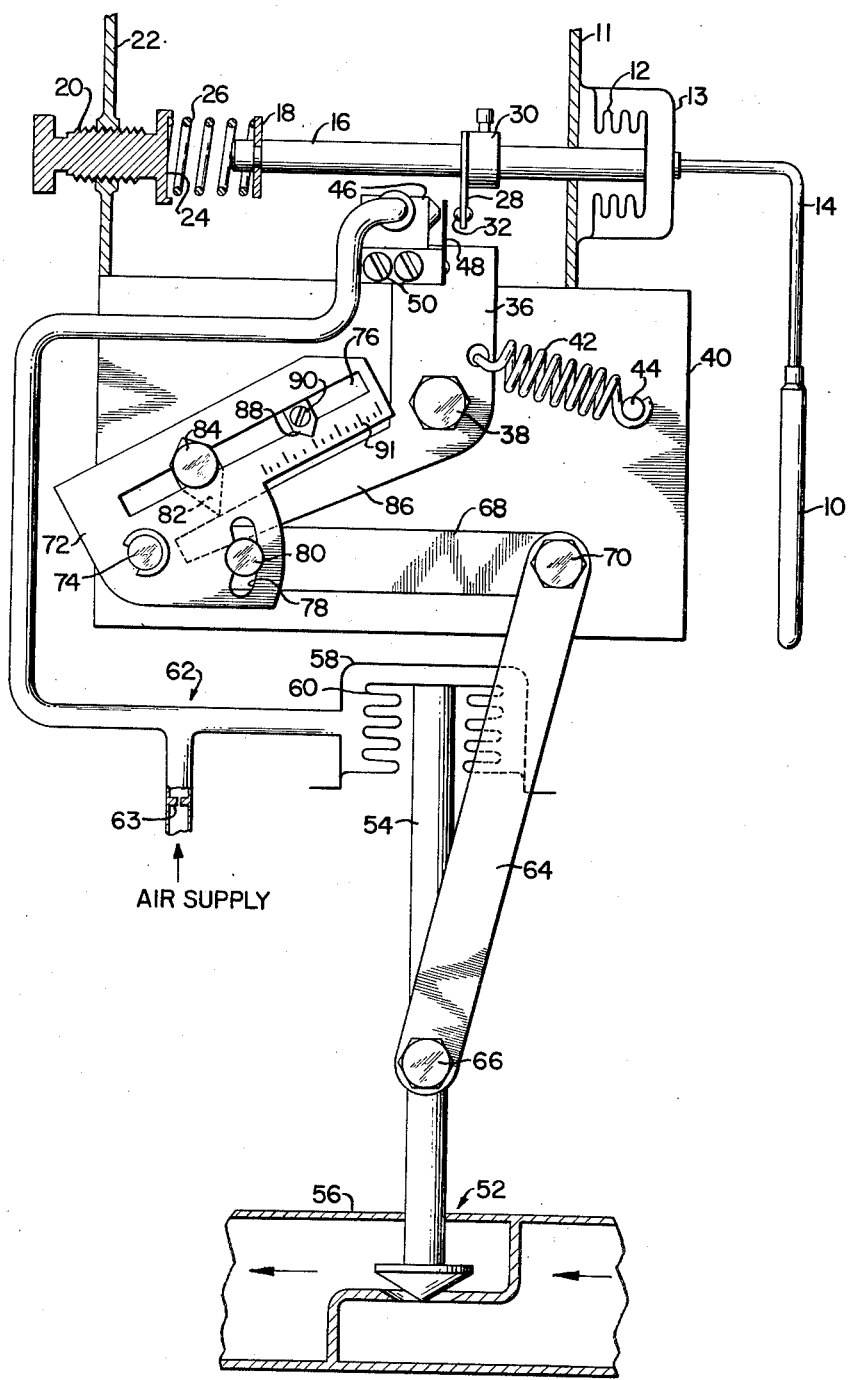
AIR SUPPLY United States Patent Office 3,080,853
Patented Mar. 12, 1963

3,080,853
CONTROL MECHANISM
Louis M. Puster, Knoxville, Tenn., assignor to Robertshaw-Fulton Controls Company, Richmond, Va., a corporation of Delaware
Filed Feb. 2, 1961, Ser. No. 86,724
1 Claim. (Cl. 121—41)

This invention relates to a device for proportionally adjusting the response of a control device to obtain full control element movement and more particularly to an adjustable motion transmitting device connected intermediate a final control element, such as a valve, and a sensing element of a pneumatic control device wherein the pneumatic control device is responsive proportionally to a measured deviation from a set point.

It is an object of this invention to utilize an adjustable control mechanism which proportionally translates motion from a control element to a pneumatic sensing control element.

Another object of this invention is a simplified control mechanism for proportionally transmitting motion, which device has a plurality of correlated positions adjustable in accordance with the movement of the final control element.

In accordance with one feature of this invention, a primary measuring element, such as a temperature responsive device, actuates a pressure sensitive flapper-nozzle pneumatic device to regulate the pressure within a pressure operated actuator, which actuator, in turn, controls the position of the final control element. A feedback linkage arrangement is connected to a movable portion of the pressure operated actuator to interconnect the flapper-nozzle pneumatic device so that a change in a measured variable is further sensed by the flapper-nozzle pneumatic device to cause the pressure operated actuator to proportionally move the final control element. An adjustable motion transmitting device is positioned intermediate the flapper-nozzle pneumatic device and the final control element, which device can be adjusted to proportionally vary the respective magnitude of displacement of the flapper-nozzle device and final control element, within limits, in response to the measured variable.

Other objects and advantages of this invention will be apparent from the following description taken in conjunction with the accompanying drawings in which the proportional adjustment device is shown operatively connected to a schematically represented control system.

Referring more particularly to the drawing, a condition responsive device 10, which can take the form of a tubular temperature responsive element, is in communication with a bellows 12 by conduit 14. Bellows 12 is secured to cap 13 by any suitable means, such as soldering. Cap 13 is in turn secured to support 11 of housing 40. A rod 16 is secured to bellows 12 and is adapted for movement therewith upon a change in the ambient conditions sensed by the condition responsive device 10. Adjacent the opposite end of rod 16, a spring retainer washer 18 is secured. A rotatable adjustment knob 20 is threadedly engaged to support 22 of housing 40 and has a spring retainer recess 24 positioned therein. Compression spring 26 is positioned intermediate washer 18 and recess 24, which spring tends to bias rod 16 against the pressure exerted on bellows 12 in response to the condition sensed by the condition responsive element 10.

Intermediate the length of rod 16, a flapper actuator 28, carried by collar 30 secured to rod 16, is adapted to depend downwardly a short distance so as to be displaced from the longitudinal axis of rod 16. The end 32 of flapper actuator 28 moves in response to axial movement of rod 16.

A first lever, in the form of a bell crank 36, is pivotally mounted on bolt 38 threadedly connected to housing 40. A helical tension spring 42 is connected at its opposite ends to a stationary rod 44 which extends perpendicularly from plate 40, and bell crank lever 36 for biasing the bell crank lever in a clockwise direction about bolt 38. A nozzle 46 and a flapper 48 are assembled and mounted on the bell crank lever 36 by means of a plurality of screws 50.

A valve 52, which has a valve stem actuator 54, intersects a conduit 56 through which a control agent passes. Valve stem actuator 54 extends exteriorly of conduit 56 and is actuated in a reciprocal movement by a pressure operated actuating means 58 which includes a bellows 60. A suitable conduit 62 communicates both the nozzle 46 and the chamber of the pressure actuating means 58 with an air supply having an orifice 63. The air supplied to orifice 63 will be supplied at a substantially constant pressure.

A link arm 64 is pivotally secured by a nut and bolt assembly 66 to valve stem actuator 54 and is adapted for movement in response to any reciprocal movement of actuator 54. A third lever 68 is pivotally mounted to link 64 by a second nut and bolt assembly 70.

A slotted pivot plate member 72 is pivotally mounted to housing 40 by a stationary rod and bearing washer assembly 74 projecting outwardly from the flat plate surface of housing 40. Plate member 72 has an irregular configuration such that an elongated slot 76 extends substantially the longitudinal length of one portion of the plate member. A second slot 78 is formed in a flanged portion of plate member 72 and has a thumbscrew 80 adapted to cooperate with slot 78, which thumbscrew 80 threadedly engages a suitable cooperating aperture in lever 68. Accordingly, it will be readily understood that plate member 72 will reflect the pivotal movement of lever 64 and lever 68 while simultaneously rotating about pin 74.

A sliding pivot 82, which is threadedly engaged to thumbscrew 84, can be positioned and locked into place in slot 76 by tightening thumbscrew 84 at any desired location within slot 76.

The knife edge of sliding pivot 82 engages the upper surface of the elongated arm 86 of bell crank lever 36. It will be obvious, therefore, that once lever 68 is secured to proportional band link member 72, the placement of sliding pivot 82 will determine the relative proportional movements between stem actuator 54 and bell crank lever 36.

To better illustrate this movement, if the sliding pivot 82 is in the position substantially as shown in the drawing, pivotal movement of plate member 72 about pin 74 is responsive to a finite movement of actuator stem 54 and will be reflected in a relatively small movement of bell crank lever 36. This movement takes place because the distance from the knife edge of sliding pivot 82 to the axis of bolt 38 is relatively great; whereas, the distance of the knife edge of sliding pivot 82 from the axis of pin 74 is relatively small. However, if the sliding pivot 82 is moved to the right in slot 76 so as to be positioned closer to bolt 38, the same finite movement of actuator stem 54 will produce a relatively large pivotal movement of bell crank lever 36. In this second instance, the radius at which the sliding pivot 82 is displaced from the axis of rod 74 is substantially greater than in the first instance so as to produce a greater displacement of sliding pivot 82 and hence bell crank lever 36 will be displaced through a relatively large arc.

A valve lift indicator 88 is securely positioned within slot 76 by adjusting screw 90 to prevent extreme settings of sliding pivot 82. The indices 91 scribed on plate member 72 indicates the valve lift of the particular valve 52 being used. Therefore, valve lift indicator 88 acts as a stop to prevent sliding pivot 82 from being set at a point at which the condition responsive device 10 would not make sufficient travel to cause valve 52 to cause a full stroke in the opening and closing directions. Since the measuring means is used for all valve sizes and types, the maximum travel of the measuring means is fixed, as is the maximum proportional band. In order to always assure full stroke movement of the valve for the various stroke requirements, the linkage ratio must not be set beyond the point that would require more travel of the measuring means than is available.

In operation, air is introduced through orifice 63 and conduit 62 to both the pressure operated actuating means 58 and the nozzle 46. Nozzle 46 moves in response to movement of valve stem actuator 54 by the operative connection of links 64 and 68, plate member 72, and bell crank lever 36. Opposite nozzle 46 is flapper 48 which is moved into or out of relative engagement with the nozzle 46 by the lateral movement of flapper actuator 28 connected to rod 16 which in turn is moved by bellows 12.

Adjustment of the set point is achieved by rotating knob 20 which increases or decreases the force of compression spring 26 to thereby oppose the force of bellows 12.

Inlet air from the air supply passes through orifice 63 and is supplied to nozzle 46. As nozzle 46 is larger than the inlet from the air supply, the air is exhausted from nozzle 46 at substantially atmospheric pressure. By variably spacing flapper 48 from nozzle 46, the resistance of flow through nozzle 46 is changed, which change is reflected in the pressure acting on bellows 60. In operation, when flapper 48 is spaced from nozzle 46, the air supply acting on bellows 60 is substantially atmospheric so that the bellows 60 will be substantially fully retracted within pressure operated actuating means 58 and accordingly valve 52 will be in its full open position.

As the desired set point is registered by the condition responsive device 10, the rod 16 will be urged towards knob 20 to thereby engage flapper actuator 28 with flapper 48 tending to partially restrict the air exhausted from the nozzle 46. Consequently, pressure is built up in conduit 62 and pressure operated actuating means 58 to thereby move valve 52 towards a closed position in proportion to conditions sensed at condition responsive device 10.

Movement of valve stem actuator 54 is accurately followed by link arm 64, lever 68, and plate member 72. As plate member 72 is rotated in a clockwise direction about rod 74, sliding pivot 82 rotates bell crank lever 36 in a counterclockwise direction about bolt 38 to thereby cause the nozzle 46 to displace away from flapper actuator 28. Simultaneously, flapper 48 tends to be disengaged from flapper actuator 28 to thereby uncover nozzle 46, whereby the air pressure in conduit 62 is decreased and a position of substantially static balance is reached wherein the valve 52 is positioned according to the position of condition responsive device 10.

Upon a decrease in measured variable at the condition responsive device, the operation described above is substantially reversed and briefly is described as follows: Rod 16 is displaced away from the knob 20, nozzle 46 is fully uncovered, there is a decrease in pressure within conduit 62, valve stem actuator 54 moves upwardly, bell crank 36 is pivoted clockwise about bolt 38 positioning nozzle 46 relative to flapper 48 in accordance with the new condition sensed.

It will be obvious that the valve lift of valve 52 is directly dependent on the type of valve being used. It follows, therefore, that the minimum distance of reciprocal travel of valve stem actuator 54 to actuate valve 52 between a fully open and a fully closed position must be readily determined for proper operation. As the sliding pivot 82 determines the distance of movement of bell crank lever 36, and, accordingly, the relative positions of flapper actuator 28 with flapper 48, it is necessary to limit the proportional band through which sliding pivot 82 can be positioned. Therefore, valve lift indicator 88 is incorporated as a stop so that sliding pivot 82 cannot be positioned so as to prevent the minimum displacement of bell crank lever 36 which would prevent valve 52 from reaching its fully open or fully closed position.

Also, it is obvious that if sliding pivot 82 is positioned in slot 76 adjacent rod 74, the relative displacement of arm 86 of lever 36 will be small compared to a large displacement of plate member 72; whereas, if sliding pivot 82 is displaced a relatively large distance from rod 74, the displacement of arm 86 of lever 36 will be large compared to a small displacement of plate member 72. At the second position, valve 52 in operation remains substantially stationary with very little modulation so that there is only a slight change in fluid flow through conduit 56. Therefore, at the second position, a maximum temperature change at device 10 is required to move valve 52 to its fully opened or fully closed position.

It will be apparent to those skilled in the art that many changes can be made in the arrangement of parts without departing from the scope of this invention as defined in the appended claim.

I claim:

In a control mechanism having a frame, a control element movably mounted upon said frame, a pneumatic pressure source, pneumatic means operatively coupled to said control element to shift said control element relative to said frame in response to variations in the pressure applied to said pneumatic means and a flapper and a nozzle pneumatically connected to said source and said pneumatic means for varying the pressure applied to said pneumatic means in accordance with the spacing between said flapper and said nozzle; the improvement comprising a double armed bell crank lever pivotally supported on said frame, means mounting said flapper and nozzle upon one arm of said bell crank lever for movement therewith, a second lever pivotally mounted upon said frame and having a first arm portion extending adjacent the other arm of said bell crank lever, an abutment member mounted upon said arm portion of said second lever and engaging said other arm of said bell crank to define a motion transmitting abutment for transmitting pivotal movement of one of said levers to the other of said levers, means for adjusting said abutment member longitudinally of said arm portion to vary the distance between the point of engagement between said abutment member with said other arm of said bell crank and the pivotal axis of said bell crank, link means coupled between said control element and said second lever for transmitting movement of said control element to said second lever to drive said second lever in pivotal movement about its axis, and means for adjustably varying the coupling between said link means and said second lever to selectively vary the pivotal position of said second lever about its axis corresponding to a given position of said movable control element relative to said frame.

References Cited in the file of this patent

UNITED STATES PATENTS

| | | |
|---|---|---|
| 2,298,112 | Edwards et al. | Oct. 6, 1942 |
| 2,789,543 | Popowsky | Apr. 23, 1957 |
| 2,989,034 | Puster | June 20, 1961 |